3,423,379
MOLECULAR WEIGHT CONTROL OF POLYMERS
Lowell D. Grinninger and Harry Greenberg, Cincinnati, Ohio, assignors to National Distillers and Chemical Corporation, New York, N.Y., a corporation of Virginia
No Drawing. Filed Nov. 14, 1966, Ser. No. 593,629
U.S. Cl. 260—82.1                                    15 claims
Int. Cl. C08f 1/56, 1/28

ABSTRACT OF THE DISCLOSURE

A process is provided for control of the molecular weight of alifin polymers and copolymers by carrying out the polymerization in the presence of an alfin catalyst and an allylbenzene compound, an allylnaphthalene compound, or mixtures thereof as a molecular weight modifier.

---

This invention relates to a process for the controlled polymerization of unsaturated organic compounds and, more particularly, to an improved process for the production of polymers and copolymers of unsaturated organic compounds, said polymers and copolymers having controlled molecular weights. Specifically, the invention provides a new class of compounds capable of functioning as molecular weight control agents in the production of polymer products by polymerizing or copolymerizing unsaturated organic compounds in the presence of an "alfin" catalyst.

The polymerization of unsaturated organic compounds, e.g., ethylenically unsaturated compounds such as conjugated diolefins including 1,3-butadiene, with or without comonomers such as vinyl aromatics including styrene, in the presence of an "alfin" catalyst, as defined hereinafter, is known. The use of an alfin polymerization catalyst results in an unusually rapid rate of reaction and in good yields of polymer. In comparison with synthetic rubbers made by conventional catalytic polymerizing techniques, the alfin rubbers are generally gel-free and have higher flex-life values, high tensile strength, superior abrasion resistance and tear strength. Alfin rubbers however, have the disadvantage of being characterized by extremely high molecular weights, i.e., 5,000,000 and over as indicated by viscosity measurements. Because of such high molecular weights, these rubbers are very tough and exhibit little breakdown and extremely poor banding on being milled. They are, therefore, very difficult to process using conventional equipment and conventional procedures, and attempts to mill and compound them result in very rough stocks with relatively high shrinkage and exceedingly high viscosities. Attempts to obtain an alfin rubber of lower molecular weight by regulating the polymerization have proved unsuccessful, and so, until now, alfin rubbers have ben commercially unattractive.

More recently, process modifiers have been discovered which have the cumulative effect of modifying the process of the polymer formation to give molecular weight controlled alfin polymers. Recently issued U.S. Patent No. 3,067,187 discloses a process for controlling the molecular weights of alfin catalyzed polymers which comprises carrying out the polymerization in the presence of certain dihydro derivatives of aromatic hydrocarbons which include 1,4-dihydrobenzene, 1,4-dihydronapthalene, 1,2-dihydrobenzene, dihydrotoluene, and dihydroxylene, and the like, and mixtures of these, with 1,4-dihydrobenzene and 1,4-dihydronaphthalene being preferred.

In accordance with the present invention, a new class of compounds has been discovered which is useful for the controlled polymerization of unsaturated organic monomeric materials and mixtures of unsaturated organic monomeric materials either with or without other organic compounds copolymerizable therewith, with an alfin catalyst.

Specifically, it has been discovered that an elastomer having controlled molecular weight can be prepared by polymerizing an unsaturated organic compound, such as 1,3-butadiene or a mixture of an unsaturated organic compound and an organic compound copolymerizable therewith, such as styrene, using an alfin catlyst where the polymerization is carried out in the presence of a suitable molecular weight control agent comprising an allylbenzene or an allylnaphthalene, as described more fully hereinafter. The addition of controlled quantities of such a molecular weight control agent to solutions of an unsaturated organic compound such as 1,3-butadiene containing an alfin catalyst gives molecular weights controlled to about 2,000,000 or less, for example controlled molecular weights as low as 50,000 or lower may be obtained. The polymer products so produced have lower intrinsic viscosities than do those made with alfin catalysts but without the use of the molecular weight control agents.

The use of an allybenzene or an allylnaphthalene molecular weight control agent does not change the ratio of 1,4-trans to 1,2-isomers in the resultant polymers, the ratio in the range of 2 to 3 in normal alfin rubbers being retained.

Any allylbenzene or allylnaphthalene compound which does not contain a substituent which would destroy the activity of the alfin catalyst may be used as a molecular weight control agent in accordance with the present invention.

Examples of allybenzenes and allylnaphthalenes useful in the present invention include but are not limited to allybenzene, both 1- and 2-allylnaphthalene, the allyltoluenes, 4-allyldiphenyl, the allylxylenes, the allylterphenyls, allylanthracene, allylphenanthrene, alkyl ethers of allyl benzenes and allylnaphthalenes wherein the alkyl group contains 1 to 12 carbon atoms such as allylanisoles, allylveratoles, dialkoxy allylbenzenes and the like. Compounds having more than one allyl group in the aromatic nucleus such as 1,4-diallylbenzene are useful. Mixtures of the various allyl compounds can also be employed. Of this series of compounds allylbenzene is the most effective and has been found to be the most readily available.

The amount of molecular weight control agent needed or any particular level of molecular weight control is in inverse proportion to its level of moderator activity. Also the amount of molecular weight control agent required for a given polymer molecular weight is dependent upon such factors as the temperature and pressure of the reaction and the quantity and type of diluents employed. In general, the amount of the agent used may vary from about one to about eighty percent, based on the weight of polymerizable monomer, with the use of about 1.5 to about 6 percent being most common.

In the practice of one embodiment of the present invention, the reactor is dried, flushed, and blanketed with an inert gas such as nitrogen or argon, and a dry inert hydrocarbon diluent and the molecular weight control agent are introduced. The reactor is then cooled to about −5° to −20° C., preferably to −10° C., the flow of inert gas is diverted, and dry monomer or mixture of monomer and comonomer is condensed into the diluent. Alfin catalyst is then charged into the cold diluent-monomer mixture; the reactor is sealed and shaken vigorously. After about two hours the catalyst is destroyed with ethanol and the polymer is withdrawn. It is then washed with an alcohol, such as methanol or ethanol, to remove the diluent and with water to remove soluble inorganic salt residues; and dried.

In another embodiment of this invention all of the ingredients except the monomer, that is, the diluent, alfin catalyst, and the molecular weight control agent, are introduced into the reactor. A controlled flow of monomer is then fed into the system over a period of about five hours. This system results in greater utilization of the molecular weight control agent than the former system, i.e. because of the extended time of reaction, less molecular weight control agent is required to produce a polymer of a given molecular weight.

Where removal of water-soluble residues is not desired, the catalyst can be neutralized, e.g., with acetic acid or hydrochloric acid, and the diluent removed by distillation while stirring. If desired, before diluent removal the polymer may be compounded with any or all of the conventional vulcanization or other additives, such as carbon, zinc oxide, stearic acid, an accelerator, and sulfur, so that the product obtained after diluent removal represents a completed formulation ready for vulcanization, thus bypassing the usual milling and mixing steps.

The process of this invention is particularly well adapted to the polymerization of butadiene itself, i.e., 1,3-butadiene, and to the copolymerization of 1,3-butadiene and styrene or isoprene and will be particularly discussed with reference to such homopolymers and copolymers. The process, however, is also applicable to the formation of polymers and copolymers of other unsaturated organic compounds. The monomeric material polymerized in accordance with the process of this invention may include, for example, butadienes, such as 2,3-dimethyl-1,3-butadiene, isoprene, piperylene, 3-furyl-1,3-butadiene, 3-methoxy-1,3-butadiene, and the like; aryl olefins such as styrene, various alkyl styrenes, p-methoxystyrene, alphamethylstyrene, vinylnaphthalene, divinylbenzene and similar derivatives, and the like; homopolymers, copolymers, and terpolymers prepared from any one or any combination of the above are contemplated to be within the scope of the process of this invention.

The polymerization or copolymerization of these reactants takes place in the presence of an alfin catalyst such as that described in U.S. Patent 3,067,187, i.e., an intimate mixture of sodium isopropoxide, allyl sodium and sodium chloride. In general, the alfin catalyst is prepared by reacting amyl chloride and sodium in pentane with high-speed stirring. One mole of the resulting amyl sodium suspension is then reacted with 0.5 mole of isopropyl alcohol and an excess of propylene to give a mixture containing sodium isopropoxide, allyl sodium, and sodium chloride. A particularly effective alfin catalyst is obtained when the sodium is employed as a finely divided dispersion, that is, a dispersion in which the average particle size is about 1 to 2 microns, such as may be prepared using a Manton Gaulin mill. When such finely divided sodium is used, ordinary stirring devices may be employed instead of high-speed comminuting equipment. In addition, the use of finely divided sodium results in a substantially quantitative yield of amylsodium and, therefore, in subsequent quantitative yields of sodium isopropoxide and allylsodium. Thus the alfin catalyst and consequently the end products of the polymerization are free of metallic sodium contamination. Also catalyst activity can be more readily reproduced when finely divided sodium (about 2 micron average particle size) is used. When maintained under an inert atmosphere, e.g., nitrogen or argon, the alfin catalyst appears to be stable almost indefinitely.

The polymerization or copolymerization reaction generally takes place at atmospheric pressure and room temperature in a suitable selected reaction medium. The pressure and temperature conditions, however, are not critical, the reaction occurring at any pressure between about 1 atmosphere and about 50 atmospheres and at any temperature between about $-25°$ and $60°$ C. or higher. The reaction medium is suitably an inert hydrocarbon, examples including pentane, hexane, a 1:1 mixture of hexane and pentane, cyclohexane, decalin, heptane, branched chain saturated hydrocarbons and the like, or mixtures thereof, with hexane and pentane being preferred. The rigorous exclusion of water from solvents, monomer, and apparatus is essential.

The process may be conducted in a batchwise, semi-continuous or continuous manner, and the polymers and copolymers so produced may be recovered by any of the conventional techniques.

The more detailed practice of the invention is illustrated by the following examples wherein parts are given by weight unless otherwise specified. These examples and embodiments are illustrative only, and the invention is not intended to be limited thereto except as indicated by the appended claims. The alfin catalyst used in these examples was prepared in accordance with the procedure described in U.S. patent application S.N. 271,487 filed Apr. 8, 1963, now Patent No. 3,317,437.

EXAMPLE 1

In carrying out each experiment, to 105 grams of dry commercial hexane diluent was added the amount of allylbenzene (in gms. shown) in Table I together with 30 gms. of dry 1,3-butadiene (about 99.9% purity). This addition was accomplished by cooling the polymerization bottle containing the 105 gms. of hexane to about $-20°$ C. and condensing therein the 30 gms. of 1,3-butadiene. Alfin catalyst, 4 ml. (0.00025 mol. allylsodium/ml.), was added to the butadiene-hexane solution. The polymerization system was sealed and maintained at room temperature with intermittent shaking. After about two hours it was opened and ethanol was added to destroy the catalyst and precipitate the polymer. The polymer product was washed intermittently with ethanol and water containing antioxidant to remove diluent and soluble inorganic residues such as sodium isopropoxide and sodium chloride. The resulting insoluble material was a white solid polybutadiene. It was given a final wash with acetone containing an antioxidant, N-phenyl-2-naphthalamine, and then dried in an oven at $40°$ C. under vacuum. Yields, intrinsic viscosities, molecular weights and microstructures are reported in Table I. Average molecular weights were determined by preparing 0.1 and 1.0 percent solutions of the polymers in toluene, determining their viscosities at $25°$ C. and extrapolating the viscosity to infinite dilution, and then applying standard viscosity-molecular weight laws.

Molecular weights were calculated for $25°$ C. using the expression $M^a = n/k$ where $n$ is the intrinsic viscosity and $k$ and $a$ are constants for polybutadiene determined for linear polymers of known molecular weights; $a$ is taken as 0.62 and $k$ as $11 \times 10^{-4}$.

TABLE I

| Ex. No. | Allyl benzene gms./30 gms. Butadiene | Polymer Yield, Percent | Intrinsic Viscosity | Calculated Mol. Wt. | Microstructure and Remarks | | |
|---|---|---|---|---|---|---|---|
| | | | | | Percent, Trans | Percent, Vinyl | Percent, Cis |
| 1 | 1.8 | 92.2 | 4.70 | 724,400 | 67.6 | 27.2 | 5.1 |
| 2 | 3.0 | 96.0 | 3.86 | 537,000 | 68.2 | 27.8 | 4.0 |
| 3 | 6.0 | 91.8 | 3.02 | 346,700 | | | |
| 4 | 7.2 | 95.7 | 2.62 | 275,400 | | | |
| 5 | 4.0 | 82.8 | 2.54 | 269,200 | (1) | (1) | (1) |
| 6 | 3.6 | 92.3 | 2.36 | 234,000 | [2] 62.1 | [2] 25.4 | [2] 12.5 |

[1] 80/20 isoprene copolymer.
[2] 85/15 styrene copolymer.

The ratio of trans to vinyl structures is 67.6/27.2 and 68.2/27.8 or 2.50 and 2.45 respectively which is in the range for true alfin polymers.

EXAMPLE 2

In another series of experiments 1-allylnaphthalene was substituted for allylbenzene in Example 1 with the results shown in Table II. This molecular weight control agent, although not as effective as allylbenzene, shows marked reduction in molecular weight of the resulting polymers.

TABLE II

| Ex. No. | 1 allynaphthalene gms./30 gms. | Polymer yield, percent | Intrinsic viscosity | Calculated molecular weight |
|---|---|---|---|---|
| 101 | 2.0 | 65.9 | 8.15 | 1,738,000 |
| 102 | 4.0 | 19.0 | 7.66 | 1,622,000 |

EXAMPLE 3

1-4-diallylbenzene was added in an amount of 0.4 gm. per 30 gms. of 1,3-butadience dissolved in 105 gms. of commercial hexane as in Example 1. To this reaction mixture was added 4 ml. of alfin catalyst. After two hours the product was isolated as 23.1 gms. of a visibly soft polymer. The intrinsic viscosity was 4.42 which corresponds to a molecular weight of 676,100. This shows the increased effect of two allyl groups on the aromatic nucleus in controlling molecular weight.

EXAMPLE 4

In a similar experiment, 8 gms. of 4-allyltoluene was employed in a polymerization experiment where 30 gms. of 1,3-butadiene was polymerized by 4 ml. of alfin catalyst over a period of two hours. The resultant polymerization product had an intrinsic viscosity of 6.62 and a calculated molecular weight of 1,259,000. The yield was 84.5%.

EXAMPLE 5

In carrying out the experiments in Table III below, to 105 grams of dry commercial hexane was added the amount of molecular weight control agent shown in the table together with 30 gms. of dry butadiene (about 99 wt. percent purity). Polymerization and a determination of physical properties were carried out in accordance with the procedures described in Example 1. Yields, intrinsic viscosities and molecular weights are reported in the Table III below.

TABLE III

| Ex. No. | Molecular weight control agent | Agent g./30 g. $C_4H_6$ | Polymer Yield, percent | Intrinsic Viscosity | Molecular Weight |
|---|---|---|---|---|---|
| 1 | 4 allylanisole | 6 | 60.2 | 8.85 | 2,042,000 |
| 2 | 4 allylveratrole | 1 | 27.2 | 9.14 | 2,089,000 |
| 3 | do | 4 | 19.7 | 6.60 | 1,230,000 |

EXAMPLE 6

In carrying out the experiments in Table IV below, to 105 grams of dry commercial hexane was added the amount of 4-allyldiphenyl shown in the table together with 30 gms. of dry butadiene (about 99 wt. percent purity). Polymerization and a determination of physical properties were carried out in accordance with the procedures described in Example 1. Yields, intrinsic viscosities, molecular weights and microstructures are reported in the Table IV below.

TABLE IV

| | 4-allyldiphenyl gms./30 gms. $C_4H_6$ | Polymer Yield, Percent | Intrinsic Viscosity | Calculated Molecular Weight | Microstructure | | |
|---|---|---|---|---|---|---|---|
| | | | | | Percent, Trans | Percent, Vinyl | Percent, Cis |
| Ex. No.: | | | | | | | |
| 1 | 2.0 | 30.8 | 5.49 | 902,400 | 65.6 | 28.5 | 5.9 |
| 2 | 4.0 | 30.8 | 5.08 | 831,800 | 58.7 | 28.3 | 13.0 |

What is claimed is:

1. In a process for preparing a polymer from at least one unsaturated organic monomer by polymerization of said monomer in the presence of an alfin catalyst, the improvement which comprises carrying out said polymerization in the presence of a molecular weight control agent comprising an allylbenzene, an allylnaphthalene or mixtures thereof.

2. The process of claim 1 in which the polymer is a homopolymer.

3. The process of claim 2 in which the polymer is polybutadiene.

4. The process of claim 1 in which the polymer is a copolymer containing a conjugated diolefin.

5. The process of claim 4 in which the polymer is a copolymer of 1,3-butadiene.

6. The process of claim 4 in which the polymer is a copolymer of 1,3-butadiene and styrene.

7. The process of claim 1 in which the polymer is a terpolymer.

8. The process of claim 1 in which said molecular weight control agent is present in amounts within the range of from 1 to 80% by weight of the total weight of monomers.

9. The process of claim 1 in which said molecular weight control agent comprises allylbenzene.

10. The process of claim 1 in which said molecular weight control agent comprises 1-allylnaphthalene.

11. The process of claim 1 in which said molecular weight control agent comprises allyltoluene.

12. The process of claim 1 in which said molecular weight control agent comprises an alkyl ether of an allylbenzene or an allylnaphthalene.

13. The process of claim 1 in which the polymer is a copolymer of 1,3-butadiene and isoprene.

14. The process of claim 1 in which said molecular weight control agent comprises 1,4-diallylbenzene.

15. The process of claim 1 in which said molecular weight control agent comprises 4-allyldiphenyl.

References Cited

UNITED STATES PATENTS

| | | | |
|---|---|---|---|
| 2,008,491 | 7/1935 | Ebert | 260—6 |
| 3,067,187 | 12/1962 | Greenberg et al. | 260—94.2 |
| 3,223,691 | 12/1965 | Greenberg et al. | 260—93.5 |

JOSEPH L. SCHOFER, *Primary Examiner.*

J. C. HAIGHT, *Assistant Examiner.*

U.S. Cl. X.R.

260—80.3, 83.7, 93.5, 94.2, 88.3, 91.1